United States Patent [19]

Garner

[11] Patent Number: 4,617,942

[45] Date of Patent: Oct. 21, 1986

[54] CHAFF SPREADING APPARATUS

[76] Inventor: David L. Garner, Rte. 2, P.O. Box 516, Rupert, Id. 83350

[21] Appl. No.: 694,621

[22] Filed: Jan. 24, 1985

[51] Int. Cl.$^4$ ............................................. A01F 29/02
[52] U.S. Cl. ............................... 130/27 R; 130/27 T
[58] Field of Search ............ 130/27 R, 27 T; 56/295, 56/13.4

[56] References Cited

U.S. PATENT DOCUMENTS

| | | | |
|---|---|---|---|
| 2,529,870 | 11/1950 | Golasky | 56/295 |
| 3,087,298 | 4/1963 | Phillips, Sr. | 56/295 |
| 3,150,479 | 9/1964 | Wolf | 56/13.4 |
| 3,186,460 | 6/1965 | Frederick | 130/27 R |
| 3,243,944 | 4/1966 | Michaud | 56/295 |
| 3,513,646 | 5/1970 | Johnston et al. | 56/20 |
| 3,587,690 | 6/1971 | Peak | 130/27 R |
| 3,593,719 | 7/1971 | Ashton et al. | 130/21 |
| 3,712,309 | 1/1973 | Schmitz | 130/27 R |
| 4,056,107 | 11/1977 | Todd et al. | 130/27 T |
| 4,160,456 | 7/1979 | Hawkins et al. | 130/27 T |
| 4,250,896 | 2/1981 | Wagstaff et al. | 130/27 T |
| 4,258,249 | 2/1981 | Dunn et al. | 130/27 T |
| 4,292,795 | 10/1981 | Linn | 130/27 R |
| 4,383,536 | 5/1983 | Delorme | 130/27 R |
| 4,484,587 | 11/1984 | Raineri | 130/27 R |
| 4,526,180 | 7/1985 | Scott et al. | 130/27 R |
| 4,535,787 | 8/1985 | Underwood | 130/27 T |

Primary Examiner—Paul J. Hirsch
Attorney, Agent, or Firm—Michael D. McCully

[57] ABSTRACT

A chaff spreading apparatus is adapted to be functionally mounted to conventional combine threshing machines in a manner to perform a secondary chopping and spreading of straw and chaff exiting the rear of the threshing machine that somehow bypass the threshing machine primary straw spreaders. The chaff spreading apparatus comprises a pair of rotating wheels or disks, each having a plurality of blades mounted thereon for catching, cutting or chopping, and scattering straw or chaff exiting the threshing machine. The disks are positioned for rotation in an essentially horizontal plane generally below and slightly behind the straw and chaff exit chute of the threshing machine in a manner to catch all of the straw and chaff sliding down the chute and chop and scatter same to the rear and sides of the threshing machine. The pitch of the chopping and scattering blades is adjustable relative to the axes of rotation of the disks in order to vary the degree of chaff and straw chopping and to adjust the swath of the straw and chaff spread for various types and densities of straw and chaff. Additionally, the rotational speed of the spreading disks and the blades is adjustable and is determined in accordance with the characteristics of the particular grain being harvested.

7 Claims, 6 Drawing Figures

CHAFF SPREADING APPARATUS

BACKGROUND OF THE INVENTION

The present invention relates generally to combine threshing machines, particularly the step performed by such threshing machines wherein straw and chaff are chopped and scattered about behind the threshing machine during the harvesting operation, and relates more particularly to a device attached to a combine threshing machine which performs a secondary chopping and scattering operation on straw and chaff that exit the rear of the threshing machine during the harvesting operation.

Threshing machines of various types are in common use today. These various types of threshing machines function in slightly different manners to perform basically identical functions: (1) harvesting or removing the grain from the ground; (2) threshing or separating the grain from the husk, straw and chaff; and (3) collecting the grain while leaving behind the straw and chaff. Various devices have been devised to scatter the remaining straw and chaff behind the threshing machine in order to prevent the build-up of a concentration of straw and chaff along a narrow path behind the threshing machine. These various devices have commonly taken the form of a pair of rotating wheels, commonly called straw spreaders, positioned at the rear of the combine somewhat in the flow of straw and chaff exiting the rear of the combine. Due to the nature of a single straw spreading operation, these "straw spreaders" have proved basically ineffective in chopping and scattering both chaff and straw due to the difference in characteristics of chaff and straw.

SUMMARY OF THE INVENTION

The present invention provides a novel device for attachment to a combine threshing machine for providing a secondary chopping and scattering operation to the straw and chaff being processed through the threshing machine. According to the invention, the chaff spreading apparatus comprises a pair of rotating wheels or disks, rotating about parallel, generally vertical axes. The rotating disks are positioned essentially behind and below the chaff and straw exit chute of the threshing machine, and generally below the rotating "straw spreading" devices of the threshing machine. In a preferred embodiment, the secondary chopping and scattering disks rotate in opposite directions in order to uniformally chop and scatter the straw and chaff that exits the threshing machine unaffected by the primary "straw spreaders". Each of these secondary chopping and scattering disks includes a plurality of upwardly extending blades that chop the straw and chaff as it exits the threshing machines rear chute. The blades also operate to "fan" the chopped straw and chaff outwardly to the rear and sides of the threshing machine.

Each of the secondary rotating disks is formed in a slight dish shape, concave upwardly, in order to provide a slight lift to the chopped chaff as the chaff is scattered from the disks. Additionally, the position of the blades on each of the secondary rotating disks is adjustable in order to vary the pitch of the blades relative to the disk. In this manner, the blade pitch may be correlated with the rotational speed of the disks for various types of grain, chaff and straw to be chopped and scattered.

BRIEF DESCRIPTION OF THE DRAWINGS

For a detailed description of the preferred embodiment of the invention, reference is made to the accompanying drawings in which.

DETAILED DESCRIPTION OF THE INVENTION

Figure 1:
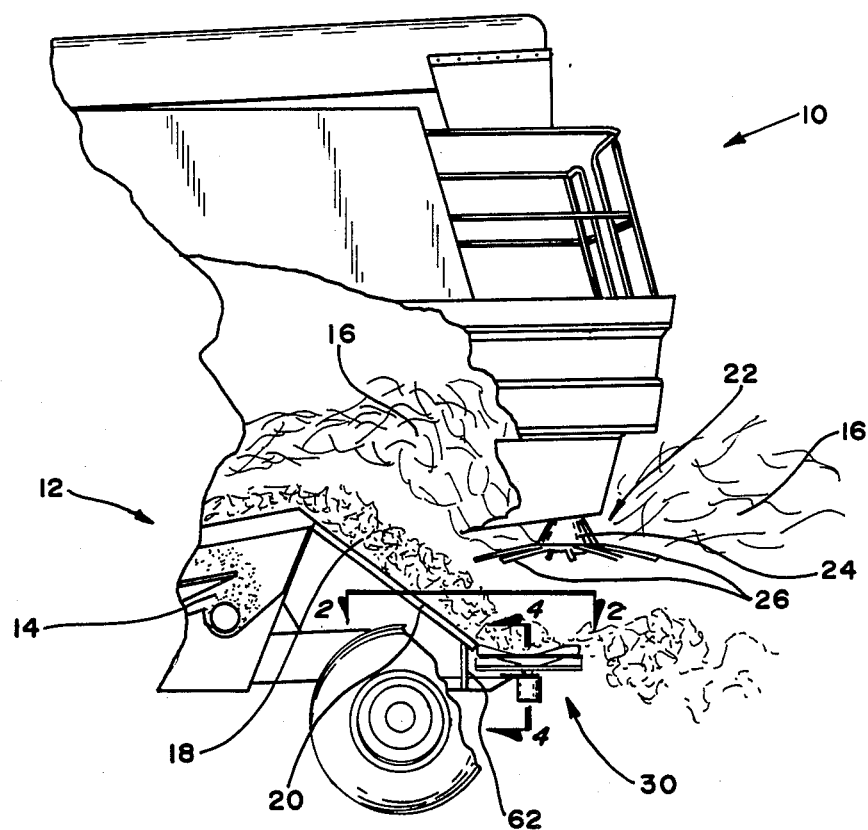
FIG. 1 is a partial side view of the rear portion of a conventional combine threshing machine showing the chaff spreading apparatus of the present invention in functional position thereon.

Turning now to the drawings, wherein like parts are indicated throughout the specification and drawings with the same reference numerals, and initially to FIG. 1, the rear section of a typical combine threshing machine is shown generally illustrated by the numeral 10. As is well known in the industry, the combine threshing machine 10 includes one or more of a particular type of grain separating device, partially shown at 12, for separating grain 14 from the straw 16 and chaff 18.

A conventional combine threshing machine 10 includes, at the rear portion thereof, a straw and chaff exit chute 20 for removing the straw and chaff separated from the grain from the threshing machine and for permitting the straw and chaff to fall out the rear portion of the threshing machine in a path behind the machine. Conventional threshing machines may also include one or more primary straw spreading devices, generally illustrated at 22 in FIG. 1.

These straw spreading devices 22 commonly take the form of one or more rotating wheels 24. These rotating wheels 24 may be formed with a plurality of radially extending blades 26 which are generally flat and may be oriented either vertically or horizontally. The threshing machine operator controls the speed of these straw spreading devices to fan the straw exiting the exit chute 20 into a wide pattern behind the threshing machine in order to decrease the build-up of straw and chaff in a path directly behind the threshing machine. Simultaneously with this "fanning" action of the straw spreading devices, the rotating wheel blades 26 serve to cut or chop large pieces of straw into smaller pieces for more efficient disbursement of the straw in a wider path behind the threshing machine.

Not all of the straw and chaff exiting the chute 20, however, is chopped and disbursed or spread by the straw spreading devices 22. A good portion of the straw and chaff (specifically the more dense material) simply slides down the top surface of the exit chute 20 and falls in a path directly behind the threshing machine. Because this heavier straw and chaff is not spread into a wider path behind the threshing machine by the straw spreading devices 22, it tends to collect and form a concentrated build-up of straw and chaff in a path directly behind the threshing machine the width of the exit chute 20. This thick build-up of straw and chaff in a path directly behind the threshing machine is undesirable, in that it forms a dense layer of straw which prevents subsequent new crops from growing in that particular path. In fact, a build-up of chaff such as that is toxic to new grain seed planted subsequent to harvesting the current crop. In order to render the earth under this build-up of straw and chaff suitable for growing subsequent crops, this heavy build-up of straw and chaff must be tilled under, which requires a separate operation in the crop harvesting process.

Figure 2:
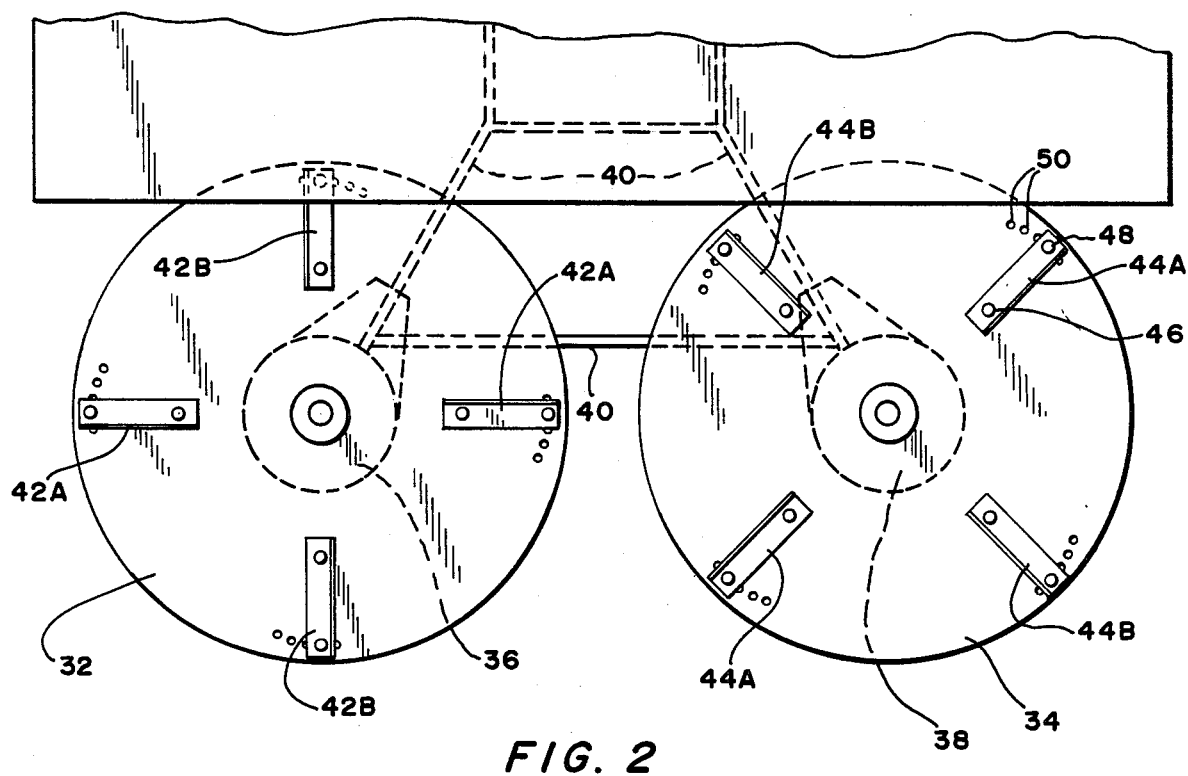
FIG. 2 is a top view of the chaff spreading apparatus shown along lines 2—2 of FIG. 1.
Figure 3:
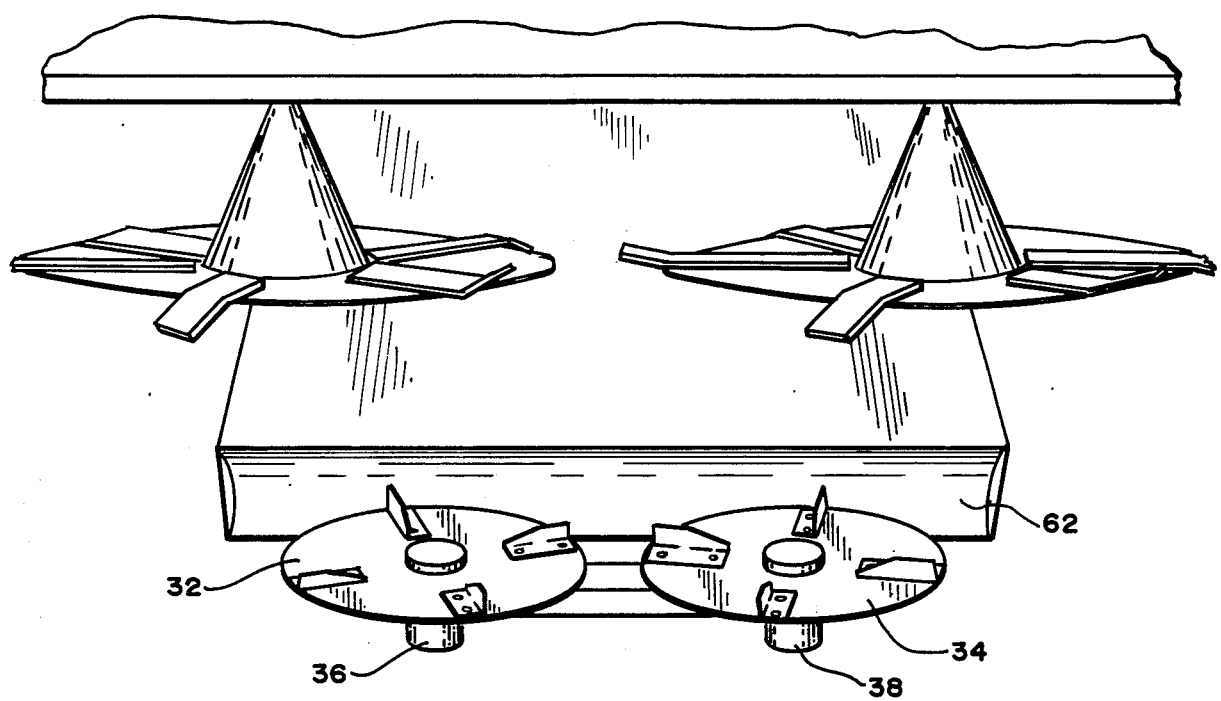
FIG. 3 is a rear view of the combine of FIG. 1 showing the relative position of the primary "straw spreading" blades of the threshing machine and the chaff chopping and scattering disks of the present invention.

With this background in mind, the chaff spreading apparatus of the present invention, generally illustrated by the numeral 30, is shown functionally mounted to the threshing machine 10 in a position generally below and slightly to the rear of the straw and chaff exit chute 20. Referring to FIGS. 2 and 3, the chaff spreading apparatus 30 comprises a pair of rotating disks 32, 34, rotatably mounted to respective variable speed motors 36, 38. In a preferred embodiment, these variable speed motors 36, 38 are individually controlled hydraulic motors which receive their hydraulic power from the threshing machine hydraulic power supply. Of course, the chaff spreading apparatus of the present invention could also utilize individually controlled electric motors, rather than hydraulic motors, or could also utilize a single variable speed hydraulic or electric motor and gear mechanism to rotate both disks 32, 34 together. As shown in the drawings, the rotating disks 32, 34 are journalled for rotation about essentially parallel, generally vertical axes. The variable speed motors are mounted to a frame structure 40, which is in turn mounted to a rear portion of the frame of the threshing machine (not clearly shown) in a customary manner.

Referring again to either FIG. 2 or FIG. 3, the rotating disks 32, 34 are shown to have attached thereto pairs of diagonally opposed cutting and spreading blades 42a, 42b, 44a, 44b. These cutting and spreading blades are shown in greater detail in FIGS. 5A and 5B, and will be explained in greater detail hereinbelow. As best shown in FIG. 2, these cutting and spreading blades 42a, 42b, 44a, 44b are adjustably mounted to respective rotating disks 32, 34 in a manner to permit adjustment of the pitch of each blade relative to the axes of rotation of the respective disks. This is accomplished by providing a pivot pin or pivot bolt 46 passing through one end of each cutting and spreading blade and through the disk 32, 34. The outer end of the respective cutting and spreading blade includes an adjustment pin or bolt 48 which is selectively insertable into each of a plurality of adjustment holes 50, each lying on an arc having its center at the respective pivot pin or bolt 46.

Those skilled in the art will readily appreciate that to insure optimum uniform spreading of straw and chaff by the chaff spreading apparatus of the present invention, the disks 32, 34 rotate in opposite directions. In the preferred embodiment the left wheel 32 rotates clockwise as shown in FIG. 2, and the right wheel 34 rotates counterclockwise. In this manner, the relative moments of inertia of the rotating disks 32, 34 cancel each other, while at the same time, resulting in even distribution or scattering of chopped chaff and straw thereby. Those skilled in the art will also readily appreciate that each rotating disk 32, 34, and the respective cutting and spreading blades attached thereto, must be dynamically balanced about the respective axes of rotation. This may be accomplished, of course, by having identical cutting and spreading blades on each rotating disk. However, the inventor has found through experience that two different sized sets of cutting and spreading blades function better to reduce the effect of the blades creating a vacuum on the upper side of the disks, which vacuum would disturb the flow of straw and chaff from the exit chute and result in uneven distribution or scattering of the chopped straw and chaff from the chaff spreading apparatus.

Figure 5A:
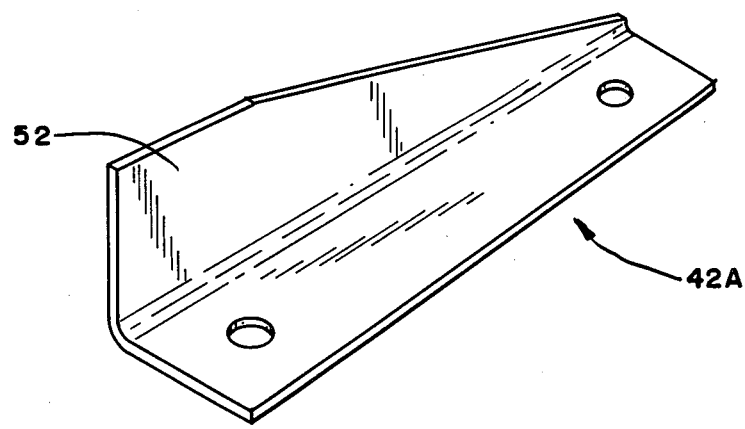
FIG. 5A is a perspective view of one of the blades utilized in the present invention.
Figure 5B:
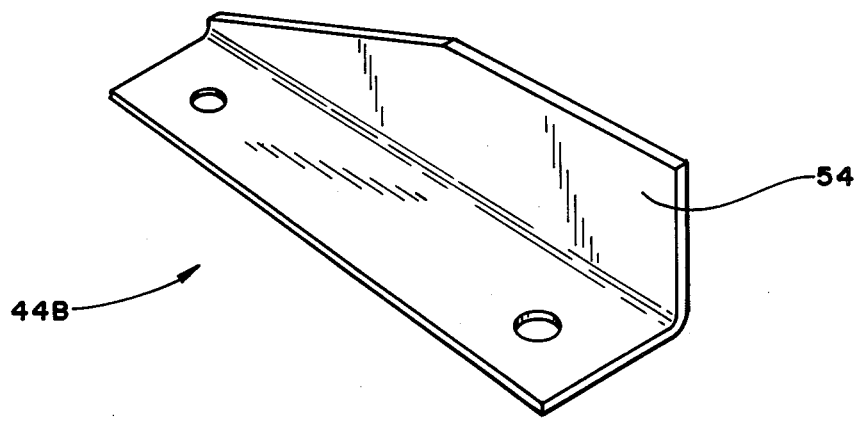
FIG. 5B is a perspective view of a different shaped blade utilized in the present invention.

Turning now to FIGS. 5A and 5B, two different sizes and orientations of cutting and spreading blades are shown. A study of FIGS. 2, 3 and 5A will reveal that the cutting and spreading blades oriented as shown are designed to be utilized on the left rotating disk 32. Likewise, a study of FIGS. 2, 3 and 5B will show that cutting and spreading blades oriented as shown in FIG. 5B (the mirror image of blades shown in FIG. 5A) will be utilized on the right rotating disk 34. A closer comparison of FIGS. 5A and 5B will show that the blade 42a has a smaller upright surface 52 than does the corresponding surface 54 of the blade 44b shown in FIG. 5B. By utilizing a pair of cutting and spreading blades 42a having the smaller upright surface 52 diagonally opposite one another on the left disk 32, and by using a second pair of cutting and spreading blades having the larger upright surface (actually the mirror image of the blade 44b shown in FIG. 5B), the left disk 32 may be maintained in dynamic balance about its axis of rotation, while simultaneously minimizing the vacuum effect of the rotating blades. Those skilled in the art will, of course, readily appreciate that same theory and use of comparible cutting and spreading blades as those shown in FIG. 5B should be used on the right rotating disk 34 to insure proper dynamic balance and uniform distribution of straw and chaff.

Figure 4:
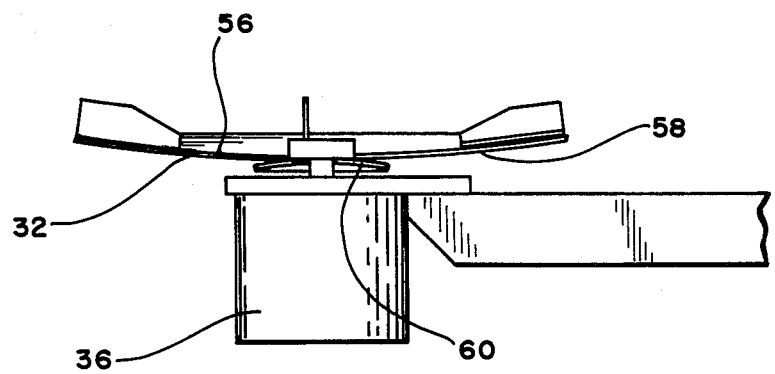
FIG. 4 is a partial vertical sectional view taken along lines 4—4 in FIG. 1 showing the relative concavities of one of the chopping and scattering disks and the smaller concave disk attached thereto.

Referring now to FIG. 4, the disk 32 is shown in vertical section through its axis of rotation. As shown, the disk is slightly dish shaped, having an inner, upwardly facing concave surface 56, and an outer, downwardly facing convex surface 58. This slight dish shape of the disk 32 imparts a slight lift or upward angle to the trajectory of the straw and chaff to result in a wider distribution of straw and chaff behind the threshing machine. The inventor has determined that the ratio of vertical rise to horizontal radius of the disks be approximately $\frac{3}{4}$ of an inch at the circumference for a 20 inch diameter wheel for an optimum trajectory angle for most types of straw and chaff.

Referring again to FIG. 4, the disk 32 has concentrically mounted for rotation therewith a smaller, circular slightly dish shaped disk 60. This smaller disk 60 may be welded or otherwise permanently affixed to the larger disk outer, downwardly facing convex surface. The purpose of this smaller disk 60 is to prevent, or at least minimumize, any wrapping of stringy material around the shaft of the motor 36 during the operation. In this manner, any stringy material inclined to wrap around the motor shaft is rather wrapped into the annular "V" between the rotating disk 32 and the smaller disk 60, where it may easily be removed from time to time by the threshing machine operator.

Referring again to FIGS. 1 and 3, there is shown a shroud 62 positioned under the straw and chaff exit chute 20 of the threshing machine on an approximate horizontal level with disks 32, 34. This shroud 62 prevents chopped straw and chaff from being thrown forwardly under the threshing machine, or otherwise into the rear axle and suspension mechanism of the threshing machine. In other words, the shroud 62 operates to direct the straw and chaff to the rear and sides of the threshing machine for even scattering and distribution.

For strength and durability, the various individual pieces of the chaff spreading apparatus of the present invention, specifically the disks 32, 34, the cutting and spreading blades, and the shroud 62, are made of metal. It should be appreciated, however, that any or all of these parts (either disk 32, 34 and 60, the cutting and spreading blades and/or the shroud) may be made of a durable plastic material without detracting from the function or efficiency of the chaff spreading apparatus.

It should be readily apparent to those skilled in the art that the overall concept of the chaff spreading apparatus of the present invention is particularly advantageous in performing a secondary chopping and spreading operation to straw and chaff exiting a threshing machine unaffected by the machine's primary straw spreading device. In this manner, a thick build-up of chaff in a path directly behind the threshing machine is avoided by having all of the straw and chaff exiting the threshing machine secondarily chopped and spread in a much wider path and thinner layer behind the threshing machine. With the instant invention, the experienced grain farmer will determine the optimum combinations of pitch adjustment of the cutting and spreading blades, size of cutting and spreading blades and rotational speed of the disks 32, 34 for any particular type of grain being harvested.

Although a preferred embodiment of the present invention has been disclosed in detail herein, it will be understood that various substitutions and modifications may be made to the preferred embodiment without departing from the scope and spirit of the present invention as recited in the appended claims.

What is claimed is:

1. Apparatus for chopping and spreading straw and chaff, said apparatus adapted to be mounted to a combine harvestor threshing machine having
   a straw and chaff exit chute; and
   straw distributing means positioned adjacent said chute for distributing straw and chaff exiting said chute,
   said apparatus comprising:
   (a) at least one rotatable slightly dish-shaped wheel positioned for rotation adjacent and generally below said straw distributing means and generally below said exit chute, said wheel having a concave surface and a convex surface, and including a disk concentrically mounted to said wheel convex surface;
   (b) a variable speed motor for driving said rotatable wheel; and
   (c) at least one pair of blades mounted on said wheel concave surface generally transverse to the axis of rotation of said rotatable wheel, said blades being diagonally opposed from one another.

2. Apparatus for chopping and spreading straw and chaff, said apparatus adapted to be mounted to a combine harvestor threshing machine having
   a straw and chaff exit chute; and
   straw distributing means positioned adjacent said chute for distributing straw and chaff exiting said chute,
   said apparatus comprising:
   (a) at least one rotatable slightly dish-shaped wheel positioned for rotation adjacent and generally below said straw distributing means and generally below said exit chute, said wheel having a concave surface and a convex surface, and including a disk concentrically mounted to said wheel convex surface;
   (b) a variable speed motor for driving said rotatable wheel; and
   (c) at least one pair of blades adjustably mounted on said wheel concave surface generally transverse to the axis of rotation of said rotatable wheel, and diagonally opposed from one another in a manner to permit adjustment of the pitch of each of said blades relative to a diameter of said rotatable wheel.

3. The apparatus as set forth in claim 2, further including a shroud positioned adjacent said rotatable wheel in a manner to direct material distributed from said rotatable wheel away from said threshing machine.

4. Apparatus for chopping and spreading straw and chaff, said apparatus adapted to be mounted to a combine harvestor threshing machine having
   a straw and chaff exit chute; and
   straw distributing means positioned adjacent said chute for distributing straw and chaff exiting said chute,
   said apparatus comprising:
   (a) at least one rotatable slightly dish-shaped wheel positioned for rotation adjacent and generally below said straw distributing means and generally below said exit chute, said wheel having a concave surface and a convex surface, and including a slightly dish-shaped disk having a convex surface, said disk being concentrically mounted to said wheel convex surface such that said disk convex surface engages said wheel convex surface;
   (b) a variable speed motor for driving said rotatable wheel; and
   (c) a plurality of pairs of blades adjustably mounted on said wheel concave surface generally transverse to the axis of rotation of said rotatable wheel, and diagonally opposed from one another in a manner to permit adjustment of the pitch of each of said blades relative to a diameter of said rotatable wheel.

5. The apparatus as set forth in claim 4, further including a shroud positioned adjacent said rotatable wheel in a manner to direct material distributed from said rotatable wheel away from said threshing machine.

6. Apparatus for chopping and spreading straw and chaff, said apparatus adapted to be mounted to a combine harvestor threshing machine having
   a straw and chaff exit chute; and
   straw distributing means positioned adjacent said chute for distributing straw and chaff exiting said chute,
   said apparatus comprising:
   (a) a pair of contra-rotatable slightly dish-shaped wheels positioned for counter-rotation adjacent and generally below said straw distributing means and generally below said exit chute, each of said wheels having a concave surface and a convex surface, and each of said wheels including a slightly dish-shaped disk having a convex surface, said disk being concentrically mounted to said wheel convex surface such that said disk convex surface engages said wheel convex surface;
(b) a pair of variable speed motors for driving respective rotatable wheels; and
(c) at least one pair of blades adjustably mounted on each of said wheel concave surfaces generally transverse to the axes of rotation of said rotatable wheels, each of said blades being diagonally opposed from one another in a manner to permit adjustment of the pitch of each of said blades relative to a diameter of said rotatable wheel.

7. The apparatus as set forth in claim 6, further including a shroud positioned adjacent said pair of wheels in a manner to direct material distributed from said wheels away from said threshing machine.

* * * * *